United States Patent [19]
Novak et al.

[11] Patent Number: 5,659,132
[45] Date of Patent: Aug. 19, 1997

[54] GASKET ENCLOSED SENSOR SYSTEM

[75] Inventors: Gary J. Novak, Indian Head Park; John F. Brady, Woodale, both of Ill.

[73] Assignee: Fel-Pro Incorporated, Skokie, Ill.

[21] Appl. No.: 399,907

[22] Filed: Mar. 7, 1995

[51] Int. Cl.$^6$ ...................................... G01L 23/22
[52] U.S. Cl. ..................... 73/115; 73/35.07; 73/35.12
[58] Field of Search ............... 73/35 KS, 35 Q, 73/35 I, 35 P, 115, 116, 35.01, 35.12, 35.07; 123/425

[56] References Cited

U.S. PATENT DOCUMENTS

| | | | |
|---|---|---|---|
| 2,775,234 | 12/1956 | Smits | 123/169 |
| 2,904,610 | 9/1959 | Morrison | 123/169 |
| 4,393,687 | 7/1983 | Muller et al. | 73/35 |
| 4,397,176 | 8/1983 | Rohde et al. | 73/35 |
| 4,425,788 | 1/1984 | Franke et al. | 73/35 |
| 4,436,068 | 3/1984 | Nakamura et al. | 123/310 |
| 4,470,392 | 9/1984 | Yoshinaga et al. | 123/310 |
| 4,525,140 | 6/1985 | Larigaldie et al. | 431/258 |
| 4,660,535 | 4/1987 | Asano | 123/425 |
| 4,686,861 | 8/1987 | Morii | 73/115 |
| 4,774,922 | 10/1988 | Morita | 123/425 |
| 4,947,680 | 8/1990 | McDougal | 73/116 |
| 4,996,873 | 3/1991 | Takeuchi | 73/115 |
| 5,046,466 | 9/1991 | Lipski | 123/310 |
| 5,066,023 | 11/1991 | Ma | 73/35 |
| 5,195,365 | 3/1993 | Chujo et al. | 73/115 |
| 5,230,238 | 7/1993 | Takeuchi | 73/35 |
| 5,380,014 | 1/1995 | Schäperkötter | 73/35 |

OTHER PUBLICATIONS

"Investigation of In-cylinder Fluid Motion Using A Head Gasket Instrumented with Ionization Probes", Witze, et al., *SAE Technical Paper Series* 910719, pp. 1–15 (1991).
"Multipoint Spark Ignition for Lean Combustion", Nakamura, et al., *SAE Technical Paper Series* 852092, pp. 1–10 (1985).

*Primary Examiner*—George M. Dombroske
*Assistant Examiner*—Eric S. McCall
*Attorney, Agent, or Firm*—Laff, Whitesel, Conte & Saret, Ltd.

[57] ABSTRACT

A gasket enclosed sensor system designed to facilitate measurement of combustion chamber parameters, and delivery of signals to a point external to the engine. In one embodiment, the system is adaptable to an internal combustion engine that includes an engine block having a cylinder bore forming a cylinder, a piston free to reciprocate within the cylinder, and a cylinder head mating with the engine block to define a combustion chamber for the cylinder.

A gasket extends from the combustion chamber to a point external to the engine, the gasket substantially surrounding the combustion chamber, and including an access opening extending from the combustion chamber to a point external to the engine. A metallic sensor terminal is positioned within the access opening in the gasket, with an insulating material substantially surrounding the metallic sensor terminal.

In other embodiments of the invention, various types of sensors and signal pathways are provided.

20 Claims, 4 Drawing Sheets

5,659,132

GASKET ENCLOSED SENSOR SYSTEM

FIELD OF THE INVENTION

This invention relates generally to sensor systems and in particular to a sensor system intended for use within an internal combustion engine, and is more particularly directed toward a gasket enclosed sensor system for an internal combustion engine.

BACKGROUND OF THE INVENTION

It cannot be denied that the introduction of the internal combustion engine heralded a new era in transportation technology. The gasoline powered automobile has proliferated to the point where our nation's highways, and the streets of our large cities, are jammed with a bumper-to-bumper collection of automobiles signalling the daily rush hours.

There has always been a concern with efficient operation of internal combustion engines, but the ubiquitous automobile has focused concern on engines that burn both cleanly and efficiently. Improper combustion gives rise to byproducts that are damaging to the environment, and gasoline burning engines manufactured today are required to meet ever-tightening standards for combustion byproducts.

Of course, even in the early days of engine manufacture, it was thought that the single spark plug, poised at the top of the engine combustion chamber, caused uneven burning by virtue of its centrally located spark even in the presence of a stoichiometric mixture. Today's engines, restricted to leaner mixtures in the quest for emission reduction, need considerable assistance in achieving efficient combustion.

Design engineers have been restricted to similar engine configurations for some years, with gasoline burning engines having combustion chambers that are crowned by a cylinder head that must provide a mounting surface for at least intake and exhaust valves, as well as some means for igniting the fuel-air mixture. Many modern engines have multiple-valve configurations, further restricting the space available at the cylinder head for both ignition mechanisms, such as conventional spark plugs, and for sensors that can be employed to monitor combustion parameters.

It has been suggested that the uneven ignition provided by a single spark plug in the cylinder could be alleviated with ignition mechanisms that could be introduced into the combustion chamber through the cylinder head gasket. The head gasket also provides a likely spot for introduction of sensors that can permit real-time monitoring of combustion within the engine cylinders. Although the combustion process can certainly be regulated via an open-loop control system, such as the familiar method of establishing ignition timing with reference to top-dead-center of a reference cylinder, this technique is not easily adaptable to the changing conditions within the modern lean-burning engine.

Dynamic perception of the flame-front profile within the combustion chamber has been theorized as one way of permitting a wide range of controls to be exercised over engine operation. Strategically placed ion probes can detect the flame front, and even create a picture of flame-front propagation over time when used in conjunction with a microprocessor engine control system. Other combustion related measurements, along with sensor arrays designed to accomplish the indicated measurements, have also been suggested as workable techniques for real-time combustion monitoring. These sensor arrays have included pressure sensors, resistance-temperature devices (RTD's), knock sensors, and infrared sensors, as well as ion probes.

Implementation of these sensor systems is made difficult by the hostile environment of the engine itself. As is well-known, the combustion chamber must be thoroughly sealed, and this seal is generally accomplished through the use of a head gasket that fits between the cylinder head and the block of the engine. The head gasket is made from a variety of temperature resistant materials. If sensors are to be introduced through the space between the cylinder head and block, the sensors and associated wiring must be interposed in this space. One method for accomplishing this involves the use of a printed circuit board laminate with a substrate composed of a high temperature polymer, such as FR4. Layers of copper are bonded to one or both sides of the substrate, then selectively etched away to form circuit paths, as is well-known in the printed circuit board art. Multiple circuit layers can be formed by alternately bonding additional substrate and copper layers to an etched circuit board, again as is well-known. Since head gaskets seal by virtue of high compressive sealing stress, compressive loads at the elevated temperatures near the combustion chamber can cause damage to the circuit paths.

Accordingly, a need arises for a gasket enclosed sensor system that is durable enough to withstand the harsh combustion chamber environment while maintaining the integrity of sensor signal pathways. Such a system should also be relatively economical to manufacture and install.

SUMMARY OF THE INVENTION

These needs and others are satisfied by the present invention, in which a sensor system for an internal combustion engine that includes an engine block having a cylinder bore forming a cylinder, a piston free to reciprocate within the cylinder, and a cylinder head mating with the engine block to define a combustion chamber for the cylinder, is provided.

The system includes a gasket extending from the combustion chamber to a point external to the engine, the gasket defining a combustion opening substantially surrounding the combustion chamber, and including an access opening extending from the combustion chamber to a point external to the engine. A metallic sensor terminal is positioned within the access opening, with an insulating material substantially surrounding the metallic sensor terminal.

In one embodiment, the gasket comprises upper and lower metal carrier plates, with both upper and lower plates including mating grooves of half-circular cross-section to provide the access opening from the combustion chamber to the engine exterior.

In another embodiment of the invention, the engine block or cylinder head is provided with an array of sensors securely housed in a metallic ring, which may be an integral part of the engine block or cylinder head. A laminated circuit card, including metallic conductors or other forms of signal pathways, can be surrounded by conventional gasket material to provide a seal between the portions of the cylinder head and block that do not come into contact with the inner metallic ring.

DETAILED DESCRIPTION

In accordance with the present invention, a gasket enclosed sensor system that provides a robust platform for sensors and their interconnections, and that is relatively economical to manufacture and easy to install, is provided. The invention can best be understood with reference to the accompanying drawing figures.

Figure 1:
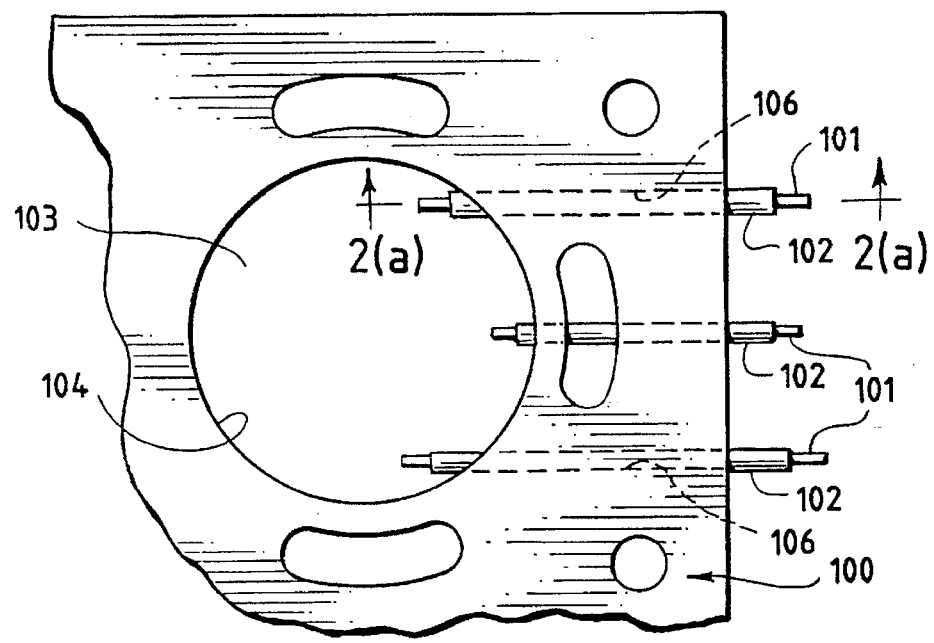
FIG. 1 is a top plan view of a gasket enclosed sensor system in accordance with the present invention.

FIG. 1 is a top plan view of a gasket enclosed sensor system in accordance with the present invention. The system is intended for use with an internal combustion engine of commonly known configuration, having an engine block that includes one or more cylinder bores within it, each of the bores defining an engine cylinder in which a piston is free to reciprocate. Mating with the engine block is a cylinder head. Together, the engine block and the cylinder head define the combustion chamber for each cylinder. As is usual with four-cycle internal combustion engines intended to use gasoline as a fuel, the cylinder head provides mounting for intake and exhaust valves, as well as a means for igniting the air/fuel mixture within the cylinder; generally, spark plugs. Of course, many of the features of the inventions are equally useful in two-cycle engines, and in compression ignition engines. Consequently, it is not intended that the invention be limited to a certain type of engine design or construction.

FIG. 1 depicts a portion of a gasket (100) having a combustion opening (103) whose edge (104) is designed to surround and be substantially coincident with the cylinder bore of the block. As can be seen from FIG. 1, the gasket (100) substantially surrounds the cylinder bore, and includes access openings (106) designed to accommodate an array of metallic sensor-terminals (101). Each of these metallic sensor terminals (101) is substantially surrounded by an insulating material (102) that may be bonded both to the gasket (100) and to the sensor terminals (101). Each of the metallic sensor terminals (101) projects into the combustion opening and the combustion chamber, preferably a distance of about 0.12 inch, and extends from the interior of the engine at the combustion chamber to a point external to the gasket and engine.

Figure 2A:
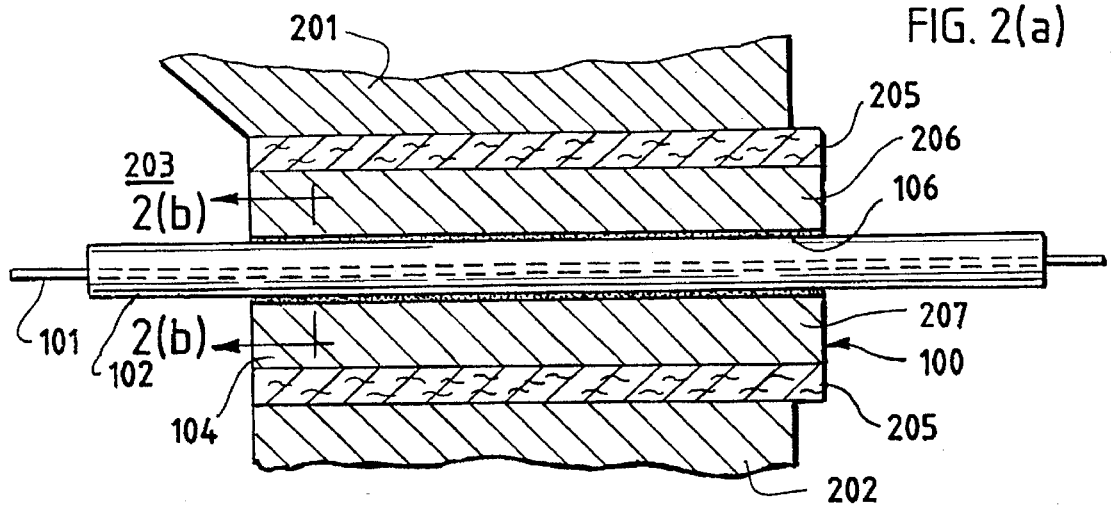
FIG. 2(a) is an enlarged section view along section line 2(a)-2(a) of FIG. 1 of a portion of the gasket enclosed sensor system.

FIG. 2(a) is a sectional view taken along section line. 2(a)–2(a) of FIG. 1, in which some other details are visible. The engine block (202) and the cylinder head (201) of the engine mate to define a combustion chamber (203) for each cylinder (only one cylinder is shown for the sake of clarity). The metallic sensor terminal (101), which may be suitable as a probe for ion sensing applications, for example, extends through the access opening (106) from the combustion chamber interior to a point outside the engine, where connection may be made to external circuitry. The sensor terminal (101) is shown surrounded by a tube of insulating material (102), which is a sapphire tube in the preferred embodiment. Sapphire is able to withstand the high temperature and stress caused by proximity to the combustion chamber (203).

Figure 2B:
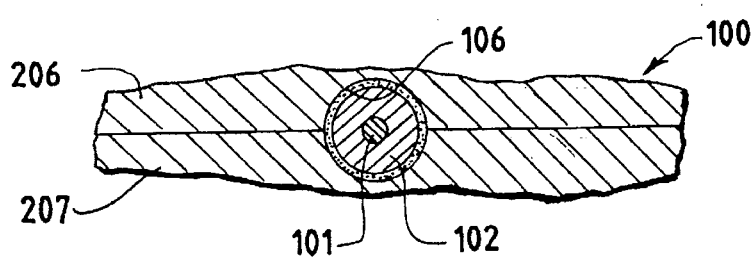
FIG. 2(b) is an enlarged section view along section line 2(b)-2(b) of FIG. 2(a) of another portion of the gasket enclosed sensor system.

As illustrated in FIG. 2(b), the gasket (100) itself, within which the sensor terminal (101) is positioned, may be fabricated from two mating plates, an upper metal carrier plate (206) and a lower metal carrier plate (207). These two carrier plates have mating grooves of semi-circular cross-section that form the substantially circular access opening (106) from the combustion chamber to the engine exterior. The insulating sapphire tube (102) may be securely bonded to the gasket (100) via a bonding layer, and may be bonded to the sensor terminal (101) as well (not shown). To improve the necessary seal between cylinder head and engine block, conventional gasket material (205) may be interposed between the gasket (100) and the cylinder head (201) on the top, and between the gasket (100) and the engine block (202) on the bottom. For the conventional gasket material, elastomer bound fibrous facing layers (205) may be used. Of course, the gasket (100) may also be fabricated from a single metallic plate, with the access openings (106) provided by gun-drilled holes, for example.

Figure 3:
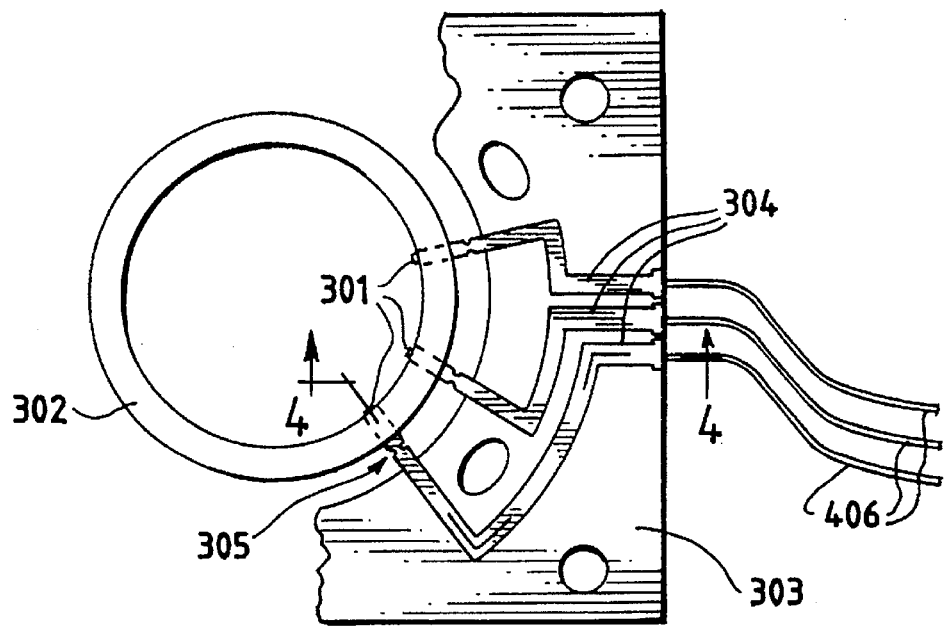
FIG. 3 is a top plan view of another embodiment of a gasket enclosed sensor system in accordance with the present invention.
Figure 4:
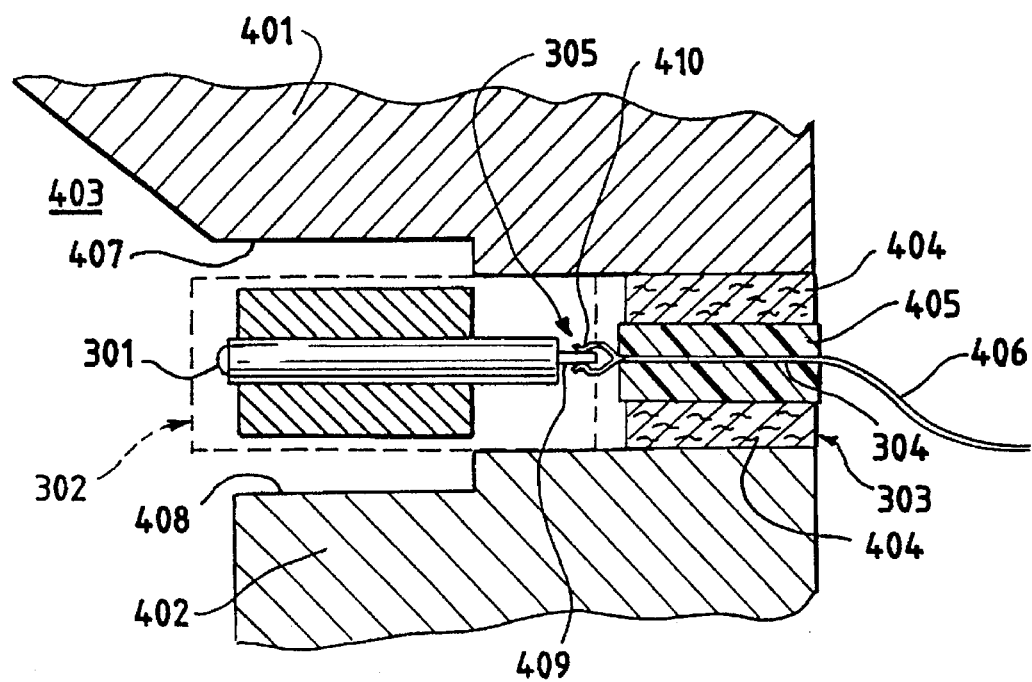
FIG. 4 is an enlarged section view along section line 4—4 of FIG. 3 of a portion of the gasket enclosed sensor system.

Another embodiment of the invention is illustrated in FIGS. 3 and 4. FIG. 3 depicts an annular, or ring-shaped, array of sensors (301) whose mounting structure (302) generally circumscribes the combustion chamber. The annular mounting structure (302) may be integrally formed as a part of the engine block or cylinder head, may be a separate piece designed to slip firmly into place during engine assembly, or may be adapted to be mounted to the gasket. In this embodiment, a gasket (303) is provided to fill the remaining space between cylinder head and block, while at the same time providing a network of signal pathways (304) between the sensor array and a point outside the engine.

The section view of FIG. 4, taken along section lines 4—4 in FIG. 3, is illustrative of additional assembly details. In an arrangement similar to the previous embodiment, the engine block (402) and cylinder head (401) meet to define a combustion chamber (403). The cylinder is not explicitly shown, although the dimension of the cylinder bore is approximately equal to the interior dimension of the annular support structure (302) of FIG. 3. The annular support structure (302) includes a number of sensors (301) whose signal outputs are delivered via signal cables (406), suitable for the particular signal type, to appropriate signal processing equipment, which may include the engine control microcomputer of the vehicle, or various diagnostic or testing instruments, via connector assemblies (305), to be discussed in more detail below. The sensors (301) are sealed into the support structure (302) using a high temperature resin, or by other appropriate sealing methods, such as solder and brazing, for example.

Since there are many processes of interest occurring within the engine combustion chamber, the sensors (301) that make up the array may-include thermocouples, resistance-temperature devices (RTD's), pressure transducers, strain gauges, knock sensors, ion probes, infrared sensors, or other sensor types useful in monitoring combustion or the combustion chamber itself.

Because of the diverse nature of the parameters that may be sensed within the engine, the gasket (303) that is interposed between block and head may be used to provide a network of signal pathways (304) to deliver sensor signals to selected and appropriate destinations. The gasket (303) is equipped with connectors (410) that mate with connectors (409) provided on each sensor, with the specific connector type dictated by the sensor type. For example, for an infrared sensor, both the sensor connector (409) and the gasket connector (410) would be designed to join sections of optical fiber suitable for transmitting infrared radiation. Similarly, if the sensor (301) were an ion probe, both the sensor connector (409) and the gasket connector (410) would be electrical connectors. In any case, the connector (410) at the gasket side provides an appropriate signal connection to a selected signal pathway (304), perhaps within a laminated circuit card (405), to deliver the sensed combustion indicia to locations outside the engine. Depending upon the specific type of sensor, the signal pathway (304) may be an electrical conductor (in the case of an ion probe sensor, for example), a capillary tube (for a pressure sensor), an optical fiber (for an infrared sensor), or other suitable signal pathway. In any event, the laminated circuit card (405) is surrounded by conventional gasket material (404) to provide suitable sealing capability, as well as to offer more protection to the network of signal pathways. The conventional gasket material may be, for example, elastomer bound fibrous facing, or other appropriate gasket material generally known in the art.

Figure 5A:
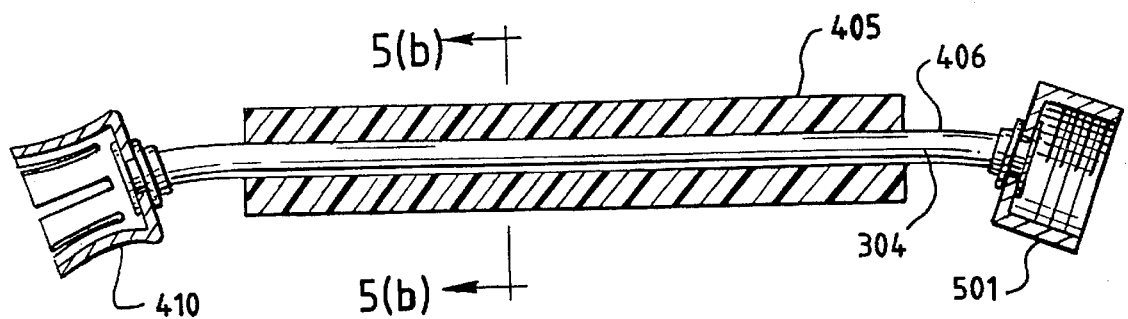
FIG. 5(a) is an enlarged section view of a portion of the gasket enclosed sensor system of FIG. 4.

FIG. 5(a) is an enlarged section view of the laminated circuit card (405) of FIG. 4. In this example, the signal pathway (304) is a capillary tube designed to provide an appropriate signal pathway for a pressure sensor. A connector (410) is provided for interface to a mating connector on the pressure sensor, while another connector (501) terminates the associated signal cable (406) for connection to external equipment.

Figure 5B:
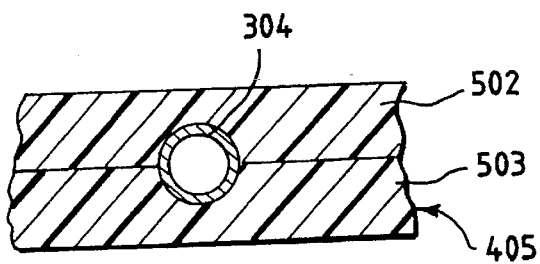
FIG. 5(b) is an enlarged section view along section line 5(b)–5(b) of FIG. 5(a) of a portion of the gasket enclosed sensor system.

FIG. 5(b), which depicts an enlarged section view of the laminated circuit card (405) from an edge-on perspective along section lines 5(b)–5(b) of FIG. 5(a), illustrates details of laminated circuit card construction. In one embodiment, the laminated circuit card (405) is formed from an upper layer (502) and a lower layer (503) of suitable high temperature substrate, such as FR4, bonded together with mating half-circular grooves provided to accommodate the signal pathway (304); in this case a capillary tube. Of course, other types of signal pathways, such as optical fibers, can be accommodated in a similar fashion, and electrical signal pathways may be provided utilizing conventional and well-known printed circuit board technology.

Figure 6:
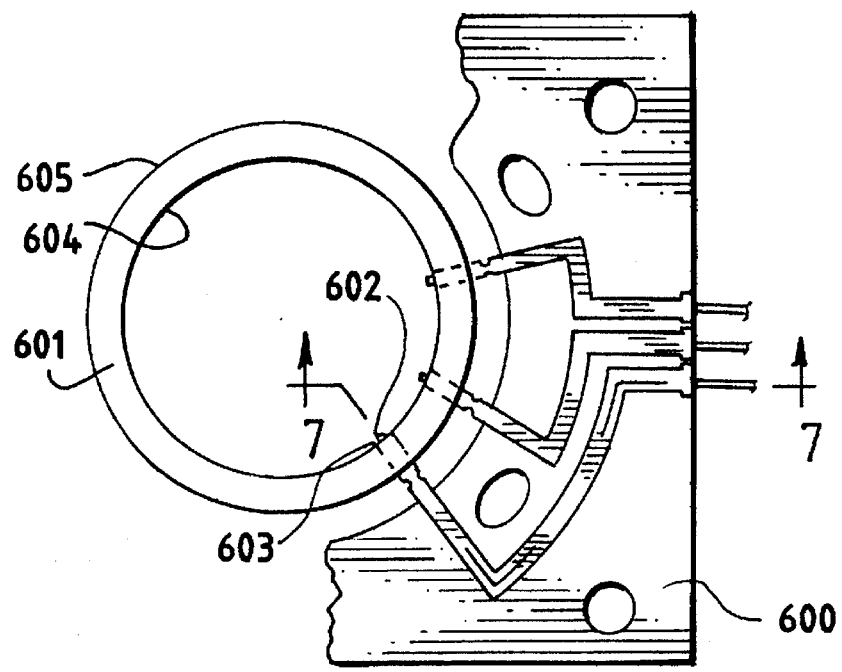
FIG. 6 is a top plan view of yet another embodiment of a gasket enclosed sensor system in accordance with the present invention.

FIG. 6 depicts yet another embodiment of the invention, in which an annular metal gasket (601) is placed between the cylinder head and the engine block. The metal gasket has an inside-edge (604) and an outside edge (605), with the inside edge (604) substantially coincident with the cylinder bore. The annular metal gasket (601) includes radially arranged access openings (606) between the gasket faces. A conductive electrode (602) projects through the access opening. An insulating material (603) substantially surrounds the electrode (602). In the preferred embodiment, this insulating material (603) is a sapphire tube.

A head gasket (600) is provided surrounding the annular metal gasket (601) (The head gasket is cut away in FIG. 6 for clarity's sake.). The head gasket (600) extends from approximately the outside edge (605) of the annular metal gasket (601), to a point external to the engine. Of courser enough space may be provided between the annular metal gasket (601) and the head gasket (600) accommodate electrical connection between the conductive electrode (602) and a gasket-housed conductor.

Figure 7:
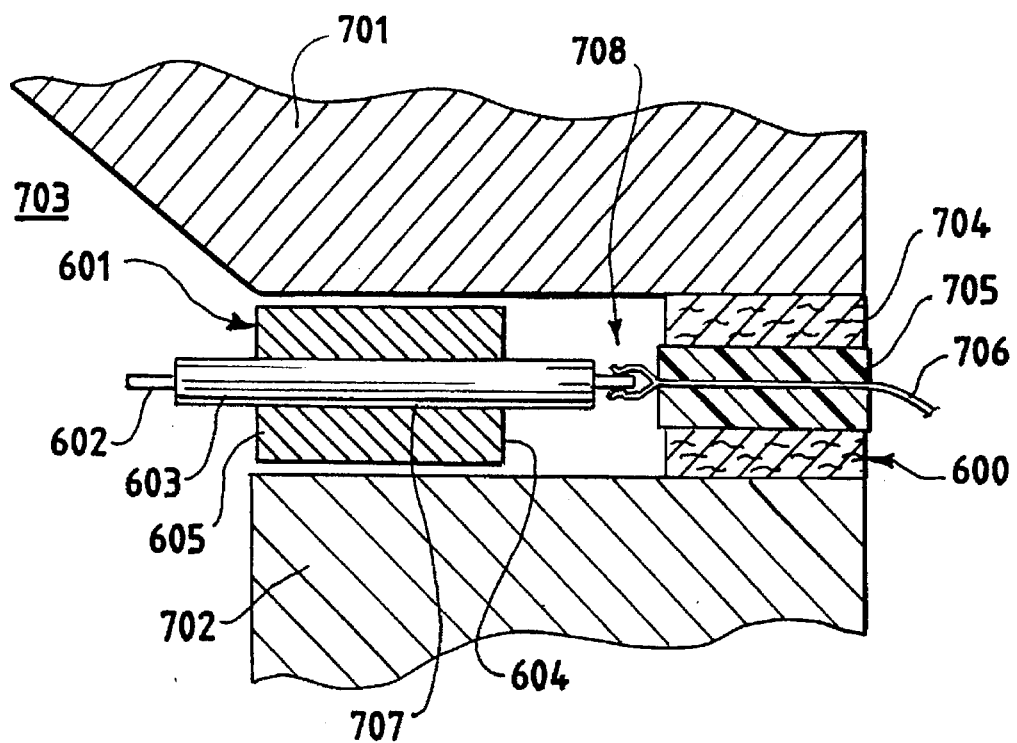
FIG. 7 is an enlarged section view along section line 7—7 of FIG. 6 of a portion of the gasket enclosed sensor system.

FIG. 7 is a section view taken along section line 7—7 of FIG. 6. The engine block (702) and cylinder head (701) are illustrated as mating to define a combustion chamber (703), within which measurements are to be made. The annular metal gasket (601) is shown with the conductive electrode (602) projecting therethrough, and an insulating material (603), in this case a sapphire tube, substantially surrounding the electrode (602). The insulating tube (603) is firmly bonded at 707 to the annular metal gasket (601).

The head gasket (600) is spaced apart from the annular metal gasket (601) by a sufficient amount to accommodate electrical connection (708) between the electrode (602) and a printed circuit board laminate (705) interior to the head gasket (600). The printed circuit board (705), constructed using well-known printed circuit board technology, includes an electrical conductor (706), connected to a printed circuit board conductive trace, that can provide an interface to a point external to the engine, To provide additional sealing, the printed circuit board (705) is provided with conventional gasket material (704), which may be elastomer bound fibrous facing, for example, disposed both between the circuit board (705) and the cylinder head (701), and between the circuit board (705) and the engine block (702).

There has been described herein a gasket enclosed sensor system relatively free from the shortcomings of the prior art. It will be apparent to those skilled in the art that modifications may be made without departing from the spirit and scope of the invention. Accordingly, it is not intended that the invention be limited except as may be necessary in view of the appended claims.

What is claimed is:

1. A sensor system for an internal combustion engine having an engine block, a cylinder bore therein forming a cylinder, and a piston free to reciprocate within the cylinder bore, and including a cylinder head that mates with the engine block to define a combustion chamber for the cylinder, the sensor system comprising:

an annular support structure substantially enclosing an array of sensors such that the sensors are disposed around, and in proximity to, the combustion chamber;

a gasket, interposed between the cylinder head and the engine block, and displaced laterally away from the annular support structure, generally surrounding the array of sensors, and extending from approximately adjacent the outer edge of the annular support structure to a point external to the engine to seal the combustion chamber and the support structure from points external to the engine, and providing a network of discrete plural signal pathways from the sensor array to a point external to the engine.

2. The sensor system of claim 1, wherein the array of sensors includes a thermocouple.

3. The sensor system of claim 1, wherein the array of sensors includes a resistance-temperature device.

4. The sensor system of claim 1, wherein the array of sensors includes a pressure transducer.

5. The sensor system of claim 1, wherein the array of sensors includes a strain gauge.

6. The sensor system of claim 1, wherein the array of sensors includes an ion probe.

7. The sensor system of claim 1, wherein the array of sensors includes an infrared sensor.

8. The sensor system of claim 1, wherein the array of sensors is integrally formed with the engine block.

9. The sensor system of claim 1, wherein the array of sensors is integrally formed with the cylinder head.

10. The sensor system of claim 1, wherein the network of signal pathways includes electrically conductive signal pathways.

11. The sensor system of claim 1, wherein the network of signal pathways includes optical fibers.

12. The sensor system of claim 1, wherein the network of signal pathways includes capillary tubes.

13. The sensor system of claim 1, wherein the network of signal pathways includes a printed circuit board.

14. The sensor system of claim 1, wherein the gasket includes gasket facing layers substantially surrounding the signal pathways.

15. The sensor system of claim 14, wherein the gasket facing layers include elastomer bound fibrous facing layers.

16. A sensor system for an internal combustion engine having an engine block including a cylinder bore therein, forming a cylinder, a piston free to reciprocate within the cylinder bore, and a cylinder head mating with the engine block and defining a combustion chamber for the cylinder, the sensor system comprising:

an annular metal gasket placed between the cylinder head and the engine block, the gasket having inside and outside edges and opposing gasket faces, with the inside edge substantially coincident with the combustion chamber, and including a radially arranged access opening between the gasket faces;

a conductive electrode projecting through the access opening;

an insulating material substantially surrounding the electrode;

a head gasket displaced laterally from the annular metal gasket, and extending from approximately the outside edge of the annular metal gasket to a point external to the engine, the head gasket including a printed circuit board assembly that connects to the conductive electrode, providing an electrical signal path from the electrode to a point external to the engine.

17. The sensor system of claim 16, wherein the insulating material comprises a sapphire tube.

18. The sensor system of claim 16, wherein the insulating material is bonded to the electrode and the annular metal gasket by a resin compound.

19. The sensor system of claim 16, wherein the head gasket includes gasket facing layers separating the printed circuit board from both the engine block and the cylinder head.

20. The sensor system of claim 19, wherein the gasket facing layers include elastomer bound fibrous facing layers.

\* \* \* \* \*